United States Patent [19]

Pletsch

[11] 4,432,537
[45] Feb. 21, 1984

[54] HYDRAULIC SUPPORT

[75] Inventor: Hubert Pletsch, Birkenau, Fed. Rep. of Germany

[73] Assignee: Firma Carl Freudenberg, Weinheim, Fed. Rep. of Germany

[21] Appl. No.: 416,258

[22] Filed: Sep. 9, 1982

Related U.S. Application Data

[63] Continuation of Ser. No. 174,528, Aug. 1, 1980, abandoned.

[30] Foreign Application Priority Data

Aug. 10, 1979 [DE] Fed. Rep. of Germany ....... 2932478

[51] Int. Cl.³ ............................................. F16F 1/36
[52] U.S. Cl. ..................... 267/8 R; 248/562; 248/634; 267/140.1; 267/141.5; 267/141.7; 280/710
[58] Field of Search ................ 188/298; 267/8 R, 35, 267/63 R, 63 A, 113, 140.1, 141, 141.3, 141.4, 141.5, 141.7, 152; 248/562, 634; 280/710, 712

[56] References Cited

U.S. PATENT DOCUMENTS

| | | | |
|---|---|---|---|
| 2,919,883 | 1/1960 | Murphy | 267/140.1 |
| 3,137,466 | 6/1964 | Rasmussen | 248/562 |
| 3,873,075 | 3/1975 | Pamer | 267/35 X |
| 4,159,091 | 6/1979 | Le Salver et al. | 248/634 X |
| 4,288,063 | 9/1981 | Brenner et al. | 248/562 X |

FOREIGN PATENT DOCUMENTS

| | | |
|---|---|---|
| 945899 | 7/1956 | Fed. Rep. of Germany . |
| 2639452 | 3/1978 | Fed. Rep. of Germany . |
| 2713008 | 9/1978 | Fed. Rep. of Germany . |
| 2718121 | 9/1978 | Fed. Rep. of Germany . |
| 7817348 | 10/1978 | Fed. Rep. of Germany . |
| 7819607 | 10/1978 | Fed. Rep. of Germany . |
| 811748 | 4/1959 | United Kingdom ................. 267/35 |

Primary Examiner—George E. A. Halvosa
Attorney, Agent, or Firm—Kenyon & Kenyon

[57] ABSTRACT

In a hydraulic support, especially for supporting and damping engines for motor vehicles, including a rubber-elastic hollow body which is adhesively connected at its upper end, along its circumference, to a metallic ring which is closed by a cover arranged at its end face, the cover having a first abutment, and which is adhesively connected at its outside surface to a second metallic abutment, the hollow body being divided by an internal nozzle system into first and second chambers which are connected to each other, the rubber-elastic hollow body has, at its lower end, an integral cup portion which defines the second chamber of the hydraulic support and the second abutment is a generally cylindrical member surrounding the cup portion, the upper end of the cylindrical member being connected to the portion of the wall of the hollow body defining the first chamber, the lower end of the cylindrical member closed off and the inside diameter of the cylindrical member being larger than the outside diameter of the cup portion and defining therewith an empty annular space.

5 Claims, 2 Drawing Figures

HYDRAULIC SUPPORT

This is a continuation of application Ser. No. 174,528 filed Aug. 1, 1980, now abandoned.

BACKGROUND OF THE INVENTION

The invention relates to hydraulic supports in general and more particularly to an improved hydraulic support particularly useful in motor vehicles.

Hydraulic supports, especially for supporting and damping engines for motor vehicles, comprising a rubber-elastic hollow body, which has its upper end adhesively connected along its circumference to a metallic ring, with the top of the metallic ring closed by means of a cover arranged at its end face, the cover having an abutment, and which hollow body also has its outside surface, in the vicinity of its lower end, adhesively connected to a further metallic abutment, the hollow body being divided by a means of a nozzle system into two chambers which are connected to each other, are known in the art. Such hydraulic supports are sometimes called "hollow liquid springs". For example, German Pat. No. 945 899 relates to a hollow liquid spring with internal damping, especially for motor vehicles. The hollow liquid spring has two chambers which are filled with a flow medium and are connected to each other in such a way that the normally throttled connecting cross section is automatically increased when a load is placed on the spring system. The main chamber consists of a hollow spring body, acting as an energy accumulator, of intrinsically elastic material, and the second chamber or expansion chamber is formed by a diaphragm of intrinsically elastic material. The diaphragm is arranged within a cup-like structure which does not limit the excursion of the diaphragm, however.

German Offenlegungsschrift No. 27 13 008 describes a liquid filled rubber-elastic engine support, especially for motor vehicles in which the upper region of the rubber-elastic hollow body surrounding the upper chamber is designed in the shape of a funnel or dish, the lower metallic abutment being embedded within the wall of the hollow body. This engine support is closed off at its end face by two resilient covers. Similar rubber-elastic engine supports are disclosed in DE-OS No. 27 18 121 and German Petty Patents Nos. 78 17 348 and 78 19 607.

It is an object of the present invention to structurally improve a hydraulic support of the type mentioned above so that it can be produced in the simplest and most inexpensive way. The number of metal parts is to be minimized and it should be possible to perform the vulcanizing process for producing the hydraulic support in only a single operation.

SUMMARY OF THE INVENTION

In accordance with the present invention, this object is achieved by making the rubber-elastic hollow body such that its lower end, which is opposite the cover, has an integral elastic cup which defines the second chamber of the hydraulic support, and by placing the second abutment, which generally has the shape of a cylinder, the upper end of which is connected to the wall defining the first chamber of the rubber-elastic hollow body, so as to surround the integral elastic cup. The lower end of the second abutment is closed off and the inside diameter of the cylinder is larger than the outside diameter of the cup thereby forming, with the cup, an empty annular space.

In one embodiment of the present invention, the upper end of the cylinder is conically tapered and embedded in the wall of the rubber-elastic hollow body, so that both the cup and the nozzle system are surrounded by the cylinder.

The hydraulic support according to the present invention has several salient advantages over comparable supports known in the art. For one, the hydraulic support only has two metal parts left. These two parts are vulcanized in a mold in a single operation. Therefore, only two metal parts must still be pretreated prior to vulcanizing, namely, the ring and the cylinder which forms the second abutment. In the hydraulic support according to the present invention, the progressive stop, furthermore, is adjustable, in that the size and depth of the closure cap of the second abutment can be varied. Thereby, the volume of the second chamber and, with it, the damping, can be changed. The hydraulic support according to the present invention, furthermore, has only a single sealing point left, namely between the cover and the ring. Furthermore, there is no contact between metal outside and metal inside the hydraulic support, so that detrimental effects through formation of a chemical cell are impossible, since the inside wall of a rolled-over edge of the ring is also covered with a thin layer of the material of the hollow body, which can be an elastomer.

The nozzle, furthermore, is easily replaceable, whereby the damping and the frequency response or the stiffness of the hydraulic support can be varied as desired. Between the upper and the lower chambers, a large volume exchange is possible with a small stroke, since the wall of the hollow body of the upper chamber is dished inwardly.

Furthermore, expansion of the cup is prevented, after a given maximum expansion, by the cylindrical abutment and its closure, in the form of a closure cap, when the cup has filled, by its expansion, the entire empty space within the cylindrical abutment and the closure cap.

A certainly decisive advantage is the simple and inexpensive design of the hydraulic support and its simple manufacture in only a single vulcanizing operation.

In a further embodiment of the present invention, the inside wall and the outside wall of the cylinder can be covered, beyond its end embedded within the wall of the hollow body, with a thin layer of the material of the hollow body. The free end of the cylinder may easily be closed off by a closure cap. Furthermore, fastening flanges can be formed at the free end of the cylinder for counter fastening the hydraulic support.

The ring connected to the rubber-elastic hollow body can furthermore extend beyond the latter, forming a rolled over edge; the ring is covered on the inside with a thin layer of the material of the hollow body.

The wall of the rubber-elastic hollow body can furthermore be dished inwardly in the region of the upper chamber.

In a further, most advantageous embodiment of the invention, a circular reinforcement of the elastomer of the hollow body can be arranged on the inside over the end of the cylinder. This reinforcement forms the stop for the cover when extended to the maximum extent. Thereby, the spring travel can be limited at the same time in an advantageous manner. The wall of the hollow body can furthermore be made with a variable thickness, i.e. thick walled and thin walled, in the region between the ring and the metal body, to give areas of different thickness each extending over the full circumference.

Furthermore, stops which serve for limiting the lateral shift of the hydraulic support, can be vulcanized onto the wall of the hollow body in the region of the ring.

In addition, different closure caps can be used for the hydraulic support, whereby different characteristics are obtained. Thereby, the hydraulic support according to the present invention can be used for different applications. The hydraulic support according to the present invention can be used to advantage for motor vehicles, for marine engines, for stationary installations, for generator systems or for body systems or the like for resilient purposes.

Assembly of the hydraulic support according to the present invention can furthermore be completed outside the damping liquid. This means that the hydraulic support no longer needs to be sealed off while immersed in the damping liquid, but can be sealed outside the damping liquid.

DETAILED DESCRIPTION OF THE INVENTION

Figure 1:
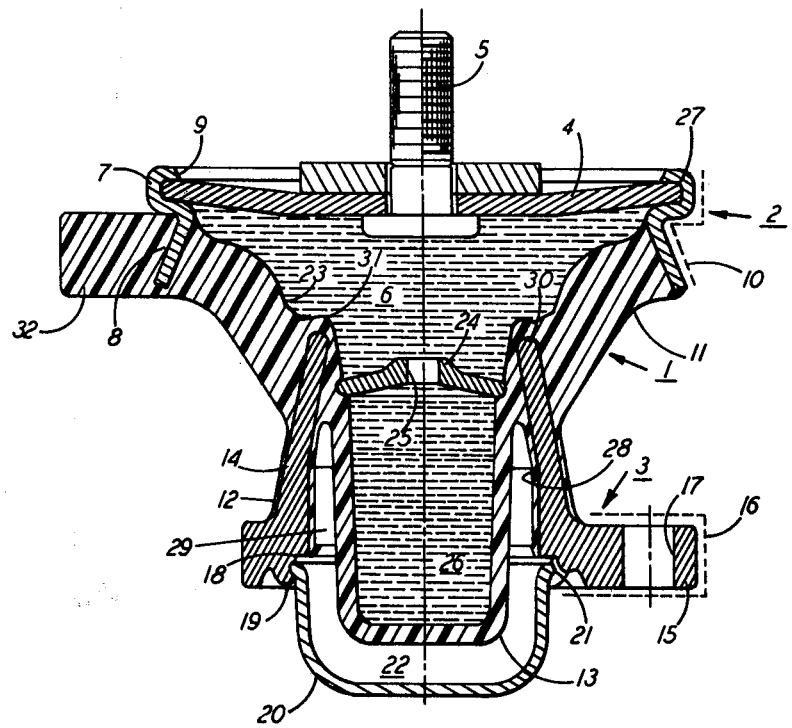
FIG. 1 is a cross section through a hydraulic support according to the present invention.
Figure 2:
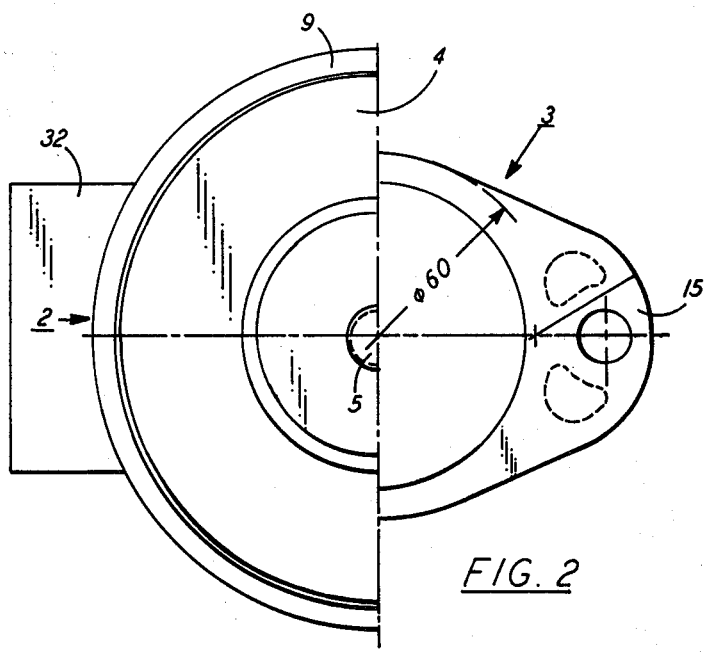
FIG. 2, a partial top view of FIG. 1 and a partial view of FIG. 1 from below.

The hydraulic support according to the present invention includes a rubber body 1, onto the upper end of which a ring 2 is vulcanized along its circumference. In addition, a cylindrical metal body 3 is vulcanized into the inside wall 11 of rubber body 1. The hydraulic support may have rotational symmetry. The upper portion of the rubber body 1 is funnel shaped and has a large wall thickness. Below the funnel shaped region of the rubber body is a cup 13 which is integrally connected thereto and has a thinner wall. The cup may be of substantially cylindrical shape. The rubber-elastic hollow body 1 is divided by means of a nozzle 24, which has a passage opening 25, into two chambers 6 and 26. The nozzle is arranged at the end of the funnel-shaped region of the hollow body. The nozzle system therefore separates the volume of the funnel-shaped region 11 from the volume of the cup 13.

The ring 2 is vulcanized onto the upper end of the hollow body along the circumference thereof. Ring 2 has an upper part 7 which extends beyond the wall 11 of the funnel-shaped portion of the hollow body 1 and forms a rolled over edge terminating in a surface 6. The ring 2 is closed off in its principal plane (or at the end face of the hydraulic support) by means of a cover 4, the upper part 7 of the ring being rolled over the edge of the cover in a liquid tight manner. The cover 4 has a fastening screw 5 which serves as an abutment. The material of the hollow body is also applied in a thin layer 27 to the inside wall of the rolled over edge 7 and surface 9, so that there is no metallic contact between the ring 2 and the cover 4. The underside of the cover 4 can additionally be provided with an insulating varnish, for instance, a synthetic resin varnish.

The second abutment, which is formed by the metal body 3 and generally has the shape of a cylinder, surrounds the cup 13. The upper end 14 of the cylindrical metal body 3 is connected to the wall 11 of the hollow body 1 surrounding the first chamber. Preferably, upper end 14 of the cylindrical metal body 3 is embedded in the wall 11 of the hollow body, or the wall 11 is vulcanized onto the end 14 of the cylindrical metal body 3. The end 14 of the metal body 3 may be shaped with a slight conical taper toward the top. The end 14 may extend beyond the cup 13 and the nozzle 24, so that both parts are completely surrounded by cylindrical metal body 3. The inside diameter of the cylindrical metal body 3 is larger than the outside diameter of the cup 13, so that a spacing 29 is provided between the inside wall of the cylindrical metal body 3 and the outside wall of the cup 13. At its lower end, the metal body 3 has a circular inside shoulder 18, into which a closure cap 20 is inserted. The rim 21 of the closure cap 20 is bent outward; a circular roll-over 19 in the vicinity of the shoulder 18 is rolled over the rim 21 of the closure cap 20, whereby the latter is firmly connected to the metal body 3. The depth and the diameter of the closure cap 20 can be chosen as desired, so that a space 22 with variable volume is provided between the cup 13 and the inside wall of the cylindrical metal body 3 and the closure cap 20. The inside and outside walls of the cylindrical metal body 3, at least at end 14 are covered with thin material layers 12 and 28 respectively beyond the portion of end 14 embedded in the wall 11.

At the lower end of the metal body 3, fastening flanges 15 are furthermore formed. Flanges 15 have through holes 17 for mounting the hydraulic support, for instance, to a part of the frame of an automobile.

The hydraulic support according to the present invention is distinguished particularly by its simple design and the fact that the entire hydraulic support consists of only six parts. The metal parts, the ring 2 and the metal body 3 are vulcanized in a single operation; the rubber-elastic hollow body together with the cup is made during this operation. The support is thereupon filled with a damping liquid and the cover 4 is put on, whereupon the upper part 7 of the ring 2 is rolled over. The lower end of the metal body 3 is provided with the closure cap 20, which can likewise be rolled over tightly. The closure cap 20 determines the maximum volume of the lower chamber and limits the volume expansion of the cup 13. At the same time, the closure cap serves to protect the cup 13 against damage.

In the area of the funnel shaped part 11 of the wall of the rubber-elastic hollow body, the wall is curved inwardly on the inside, so that a curved or bulging contour 23 is generated in cross section. Thereby, the damping can be additionally corrected and influenced.

The hydraulic support according to the present invention is furthermore distinguished by its great breadth of applications. For, different nozzle systems can be inserted into the elastic body 1. In production underpressure can be produced within the chambers in the unloaded condition or, also, an initial excess pressure established, whereby any desired pressure control is possible. In this manner, the damping can be set in many different ways. With the pre-treatment of the parts and the manufacture of the hydraulic support, the latter is distinguished by great ruggedness.

In FIG. 1, furthermore, a circular reinforcement 31 of the elastomer of the hollow body 1 is formed on the inside above the tip 30 of the end 14 of the cylindrical metal body 3 which is embedded in the wall 11. Reinforcement 31 forms a stop for the cover 4 when sprung to its maximum extent. This makes it possible to limit the spring travel.

The wall 11 of the hollow body 1 can furthermore have vulcanized stops 32 in the vicinity of the ring 2. These act to limit the lateral shifting of the hydraulic support. These stops 32 consist of the same elastomer as the hollow body and are formed in the sole vulcanizing operation.

What is claimed is:

1. A hydraulic support for supporting and damping a motor vehicle engine comprising:
   (a) a metallic ring with an end face;
   (b) a cover closing said ring at its end face, said cover having a first abutment extending therefrom;
   (c) a rubber-elastic hollow body having an upper end adhesively connected along its circumference to said metallic ring and having a lower end formed as an integral cup shaped portion;
   (d) an internal nozzle system dividing said hollow body into first and second chambers, said cup shaped portion being said second chamber, said chambers connected to each other by said nozzle system, and the wall of said body dished inwardly from the upper end of said body toward said nozzle system in the area of said first chamber to form an generally conical inner surface;
   (e) a second abutment in the form of a generally cylindrical member having a conically tapered upper end embedded in part of the wall of said rubber-elastic hollow body defining said first chamber, extending above and surrounding said nozzle system and surrounding said cup shaped portion with a spacing so as to define an empty annular space between said cylindrical member and said cup shaped portion, a mounting flange formed at the lower end of said cylindrical member;
   (f) a closure cup closing off the lower end of said cylindrical member; and
   (g) a circular reinforcement of the material of the hollow body over the end of said embedded cylindrical member, in said first chamber, forming a stop for the cover for maximum spring excursion.

2. A hydraulic support according to claim 1, and further including a covering of the material of the rubber-elastic hollow body on the inside wall and the outside wall of said cylindrical member beyond its end which is embedded within the wall of the hollow body.

3. A hydraulic support according to claim 1, wherein the ring connected to the rubber-elastic hollow body extends beyond said body forming a rolled over edge and wherein said rolled over edge covered on its inside with a thin layer of the material of the hollow body.

4. A hydraulic support according to claim 1 wherein the wall of the hollow body is made of varying thicknesses, over its circumference, in the region between the ring and the cylindrical member.

5. A hydraulic support according to claim 1 and further including stops vulcanized onto the wall of the hollow body in the vicinity of the ring for limiting lateral shifting of the hydraulic support.

* * * * *